United States Patent
Crowell et al.

(10) Patent No.: US 8,578,219 B2
(45) Date of Patent: Nov. 5, 2013

(54) MONITORING AND VERIFYING A CLOCK STATE OF A CHIP

(75) Inventors: Daniel M. Crowell, Rochester, MN (US); David D. Sanner, Rochester, MN (US); Thi N. Tran, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 408 days.

(21) Appl. No.: 13/046,865

(22) Filed: Mar. 14, 2011

(65) Prior Publication Data

US 2012/0239989 A1    Sep. 20, 2012

(51) Int. Cl.
*G06F 11/00* (2006.01)

(52) U.S. Cl.
USPC .............................................. 714/55; 713/500

(58) Field of Classification Search
USPC ................................ 714/37, 55; 713/500, 600
See application file for complete search history.

(56) References Cited

U.S. PATENT DOCUMENTS

| | | | |
|---|---|---|---|
| 6,931,091 B2 | 8/2005 | Heimbigner | |
| 6,985,980 B1 | 1/2006 | Allegrucci | |
| 7,051,227 B2* | 5/2006 | Kazachinsky et al. | ........ 713/500 |
| 7,298,179 B2 | 11/2007 | Lewis | |
| 7,454,645 B2* | 11/2008 | Li et al. | ............ 713/500 |
| 2005/0169318 A1* | 8/2005 | Minemura et al. | ............ 370/503 |

OTHER PUBLICATIONS

"Dual-Core Intel Xeon Processor 5100 Series", Intel, Datasheet, Jun. 2006, 112 pages.
"Introducing the 45 nm Next-Generation Intel Core Microarchitecture", Intel, White Paper, 2009, 8 pages.
"The Solaris OS and Intel Nehalem-Ex", Solaris, White Paper, Sep. 2009, 16 pages.
Lysecky, Roman et al., "A Fast On-Chip Profiler Memory", DAC 2002, Jun. 10-12, 2002, ACM, 6 pages.

* cited by examiner

*Primary Examiner* — Philip Guyton
(74) *Attorney, Agent, or Firm* — Francis Lammes; Stephen J. Walder, Jr.; Diana R. Gerhardt

(57) ABSTRACT

A mechanism is provided for monitoring and verifying a clock state of a chip that does not write out clock state information. Responsive to identifying an access to the chip, the access is scanned to identify a chip register and a clock domain that will be accessed. A determination is made as to whether a bit of a clock trust unit associated with the chip register and the clock domain indicates whether to trust a clock state associated with the bit in a logical clock state unit. Responsive to the bit of the clock trust unit indicating that the clock state associated with the bit in the logical clock state unit is trusted, the clock state from the logical clock state unit is identified. Responsive to the clock state matching the clock state required by the access, the access is forwarded to the chip for execution.

20 Claims, 4 Drawing Sheets

MONITORING AND VERIFYING A CLOCK STATE OF A CHIP

BACKGROUND

The present application relates generally to an improved data processing apparatus and method and more specifically to mechanisms for monitoring and verifying a clock state of a chip.

In electronics and especially synchronous digital circuits, a clock signal is a particular type of signal that oscillates between a high and a low state and is utilized like a metronome to coordinate actions of circuits. Although the word signal has a number of other meanings, the term "signal" here is used for "transmitted energy that can carry information".

A clock signal is produced by a clock generator. Although more complex arrangements are used, the most common clock signal is in the form of a square wave with a 50% duty cycle, usually with a fixed, constant frequency. Circuits using the clock signal for synchronization may become active at either the rising edge, falling edge, or, in the case of double data rate, both in the rising and in the falling edges of the clock cycle.

Most integrated circuits (ICs) of sufficient complexity use a clock signal in order to synchronize different parts of the circuit and to account for propagation delays. As ICs become more complex, the problem of supplying accurate and synchronized clocks to all the circuits becomes increasingly difficult. The preeminent example of such complex chips is the microprocessor, the central component of modern computers, which relies on a clock from a crystal oscillator. The only exceptions are asynchronous circuits such as asynchronous CPUs.

A clock signal might also be gated, that is, combined with a controlling signal that enables or disables the clock signal for a certain part of a circuit. This technique is often used to save power by effectively shutting down portions of a digital circuit when they are not in use.

The internal clock state of an integrated circuit chip, which may be referred to simply as a chip, is a very important piece of status information which is used to check for the state of the chip before allowing a chip hardware access. Traditionally, the internal clock state has been made available in a passive status value that is automatically returned after any register access. However, newer chips instead require explicit register accesses to read the clock state directly.

SUMMARY

In one illustrative embodiment, a method, in a data processing system, is provided for monitoring and verifying a clock state of a chip that does not write out clock state information. Responsive to identifying an access to the chip, the illustrative embodiment scans the access to identify a chip register and a clock domain that will be accessed. The illustrative embodiment determines whether a bit of a clock trust unit associated with the chip register and the clock domain indicates whether to trust a clock state associated with the bit in a logical clock state unit. Responsive to the bit of the clock trust unit indicating that the clock state associated with the bit in the logical clock state unit is trusted, the illustrative embodiment identifies the clock state from the logical clock state unit. The illustrative embodiment determines whether the clock state matches a clock state required by the access. Responsive to the clock state matching the clock state required by the access, the illustrative embodiment forwards the access to the chip for execution.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for accurately monitoring a clock state of an integrated circuit chip, which may be referred to simply as a chip, for clock verification without having to perform extra hardware accesses to read the chip's clock state registers. The illustrative embodiments use an intelligent caching system to remember the clock state of the chip and make a best estimation at which operations (clock running or clock stopping) may be performed.

The caching system, which is identified as a Smart Clock cache system, includes two cached units. The first unit is a Logical Clock State unit whose bits represent the states of the chip's clock domains (either 0=off and 1=on or 0=on and 1=off, depending on implementation). The second unit is Clock Trust unit that indicates a validity of bits in the Logical Clock State unit (either 0=un-trust and 1=trust or 0=trust and 1=un-trust, depending on implementation). These two units' values work in conjunction with each other and are updated when there is an activity that may result in a chip clock state change (hardware access) or chip clock state becomes unknown (losing control of the chip). To do clock checking, the illustrative embodiments monitor these two units instead of accessing the hardware every time. If the Clock Trust unit indicates the associated clock domains are 'trusted', the illustrative embodiments use the current clock state stored in the Logical Clock State unit. Otherwise, a hardware access is required, but then the Logical Clock State and Clock Trust units are updated to be valid for subsequent clock checking on the chip. In addition, as a safeguard to avoid unexpected errors, the Smart Clock cache system will verify from the hardware if an operation seems to be requested at the wrong clock state (from cache) or if the operation results in a clock state error.

Figure 1:
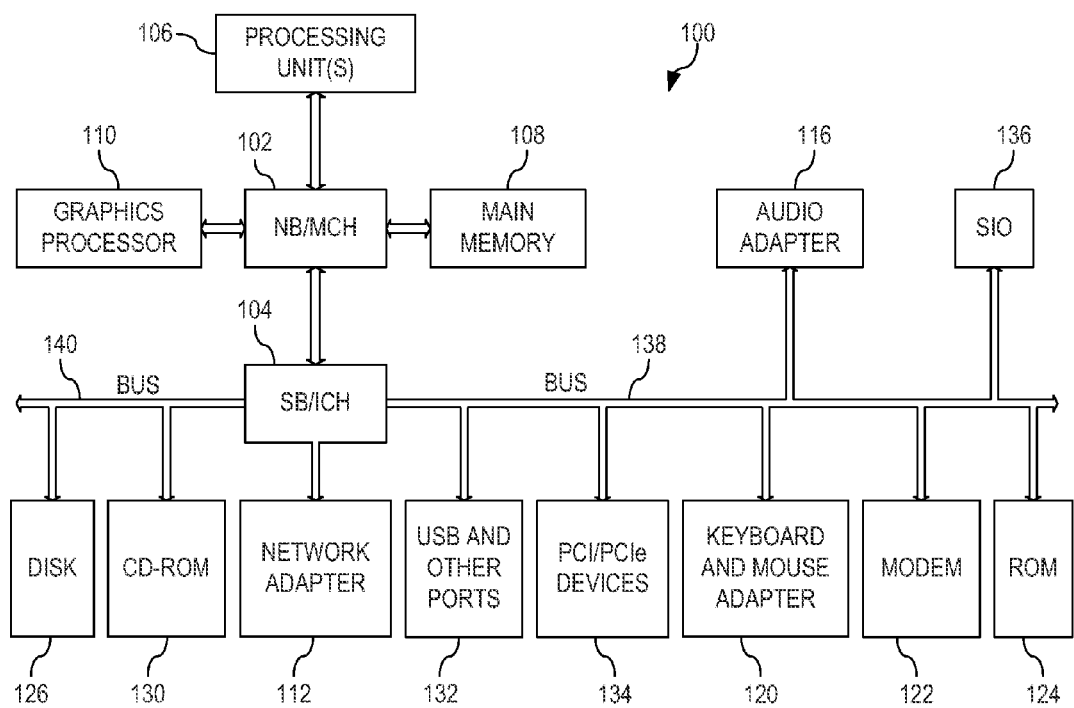
FIG. 1 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as example environments in which aspects of the illustrative embodiments may be implemented. While the description following FIG. 1 will focus primarily on a single data processing device implementation of a mechanism for monitoring a clock state of a chip for clock verification without having to perform extra hardware accesses, this is only an example and is not intended to state or imply any limitation with regard to the features of the present invention. To the contrary, the illustrative embodiments are intended to include distributed data processing environments and embodiments in which a chip's clock state is monitored for clock verification in order to reduce hardware accesses to read the chip's clock state registers.

With reference now to the figures and in particular with reference to FIG. 1, example diagrams of data processing environments are provided in which illustrative embodiments of the present invention may be implemented. It should be appreciated that FIG. 1 is only one example and is not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 shows a block diagram of an example data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 104 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® 7 (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Oracle and/or its affiliates in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system without departing from the spirit and scope of the present invention.

Moreover, data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

As stated previously, the internal clock state of a chip is a very important piece of status information which is used to check for the state of the chip before allowing a chip hardware access. While some chips automatically return the latest chip's clock state information after each hardware access, not all chips provide clock state information because the clock state information is either too large or is simply not reported. Rather than sending an explicit serial communication (SCOM) each time the clock state information is needed, the illustrative embodiments provide a mechanism for monitoring a clock state of a chip without having to perform the extra hardware accesses to read the chip's clock state registers.

Figure 2:
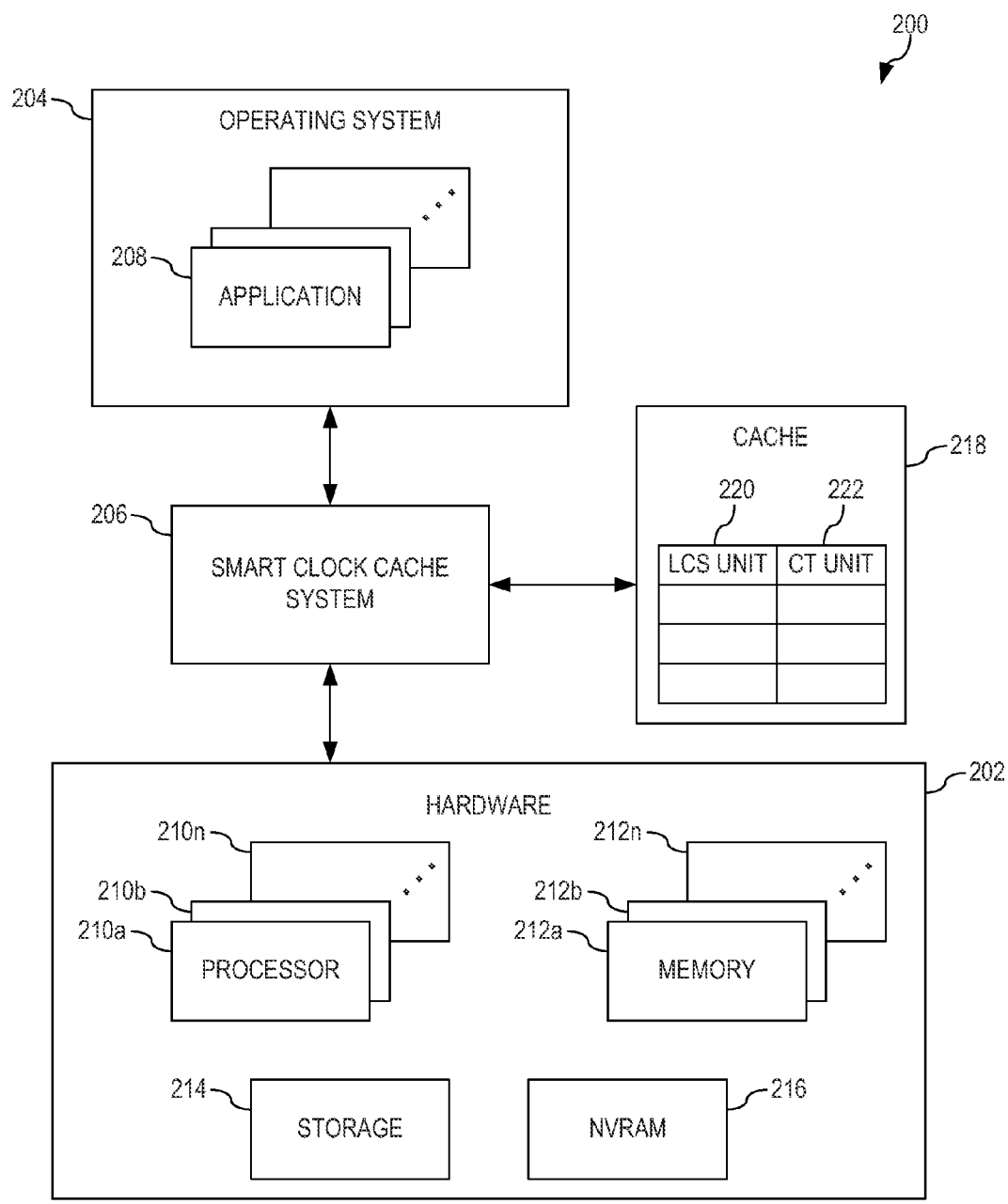
FIG. 2 depicts a block diagram of a mechanism for monitoring a clock state of a chip in accordance with an illustrative embodiment.

FIG. 2 depicts a block diagram of a mechanism for monitoring a clock state of a chip in accordance with an illustrative embodiment. Data processing system 200 comprises hardware 202, operating system 204, and smart clock cache system 206. Operating system 204, which is executed by hardware 202, may execute one or more applications 208 using hardware 202. Hardware 202 may include a plurality of processors 210a-210n, a plurality of system memory units 212a-212n, a storage unit 214, and/or non-volatile random access memory (NVRAM) 216. Each of plurality of processors 210a-210n, plurality of system memory units 212a-212n, storage unit 214, and non-volatile random access memory 216 represent integrated circuit chips that operate using a system clock signal and, thus, have a clock state. While the illustrative embodiments depicts hardware 202 comprising a plurality of processors 210a-210n, plurality of system memory units 212a-212n, storage unit 214, and non-volatile random access memory 216, other integrated circuit chips may also be comprised within hardware 202 that also use a system clock signal and may work in conjunction with smart clock cache system 206 without departing from the spirit and scope of the invention.

At initialization of data processing system 200, smart clock cache system 206 identifies all integrated circuit chips, or simply chips, within hardware 202 of data processing system 200 that do not write out clock state information. Then for each identified chip, smart clock cache system 206 creates within cache 218, Logical Clock State (LCS) unit 220 comprising a bit for each clock domain within the chip. Each bit within LCS unit 220 holds an indication of the clock state information of its respective clock domain of the chip. For each LCS unit 220, smart clock cache system 206 creates within cache 218 a Clock Trust (CT) unit 222 comprising a bit for each bit within its associated LCS unit 220. Each bit within CT unit 222 holds an indication of the validity of the clock state information in the associated bit of LCS unit 220. For example, if processor 210a comprises three clock domains, then smart clock cache system 206 would create LCS unit 220 with three bits, one bit associated with a respective clock domain. Then smart clock cache system 206 would create CT unit 222 with three bits, each bit associated with a respective bit in LCS unit 220.

At the beginning of an initial program load (IPL), smart clock cache system 206 initializes all of the validity bits in CT unit 222 to un-trusted. The validity bits may either be set to 0 for un-trust and 1 for trust or 0 for trust and 1 for un-trust, depending on implementation. After the initial program load, smart clock cache system 206 determines whether the chip is locked for internal access only. That is, during operation of data processing system 200, entities outside the scope of smart clock cache system 206, such as a diagnostic tool used in a laboratory, may need to access the chip and the chip is unlocked. If at any time during operation the chip is unlocked, smart clock cache system 206 sets all of the validity bits in CT unit 222 to un-trusted. Otherwise if the chip is locked, smart clock cache system 206 monitors all access to hardware 202.

For all other chips that do write out clock state information, smart clock cache system 206 simply forwards the access to the intended hardware in the chip for execution. When smart clock cache system 206 identifies an access to a chip that does not write out clock state information, smart clock cache system 206 scans the accesses to the identified chip registers and clock domains that will be accessed. Smart clock cache system 206 then determines whether the associated bit of CT unit 222 indicates whether or not to trust the clock state indicated by the associated bit in LCS unit 220. Since this is the first access after initialization, the associated bit in CT unit 222 indicates that the clock state indicated by the associated bit in LCS unit 220 is un-trusted. Thus, smart clock cache system 206 reads the clock state of the associated clock domain from the chip and updates the associated bit in LCS unit 220 to either indicate 0 for off/stopped and 1 for on/running or 0 for on/running and 1 for off/stopped, depending on implementation. Smart clock cache system 206 then sets the associated validity bit in CT unit 222 to trusted.

Smart clock cache system 206 then determines whether the current clock state indicated by the associated bit in LCS unit 220 matches the clock state required by the access. If the current clock state fails to match the clock state required by the access, smart clock cache system 206 returns an invalid access error to the requestor because clocks cannot be changed while the system is operational or the currently running operations will fail. Then smart clock cache system 206 waits for the next access. If the current clock state matches the clock state required by the access, then smart clock cache system 206 forwards the access to the intended hardware in the chip for execution. Then smart clock cache system 206 waits for the next access.

When smart clock cache system 206 identifies access to the chip that is not immediately after initialization of the system, smart clock cache system 206 scans the access to identify the register and clock domain that will be accessed. The smart clock cache system 206 then determines whether the associated bit of CT unit 222 indicates whether or not to trust the clock state indicated by the associated bit in LCS unit 220. If the associated bit in CT unit 222 indicates that the clock state indicated by the associated bit in LCS unit 220 is un-trusted, then smart clock cache system 206 proceeds as previously described.

If the associated bit in CT unit 222 indicates that the clock state indicated by the associated bit in LCS unit 220 is trusted, then smart clock cache system 206 identifies the clock state as is indicated by the associated bit in LCS unit 220. Smart clock cache system 206 then determines whether the current clock state indicated by the associated bit in LCS unit 220 matches the clock state required by the access. If the current clock state indicated by the associated bit in LCS unit 220 fails to match the clock state required by the access, smart clock cache system 206 verifies the clock state of the associated clock domain by reading the clock state of the associated clock domain from the chip and updating the associated bit in LCS unit 220 to either indicate 0 for off/stopped and 1 for on/running or 0 for on/running and 1 for off/stopped, depending on implementation. Smart clock cache system 206 then sets the associated validity bit in CT unit 222 to trusted.

Smart clock cache system 206 then determines whether the current clock state indicated by the associated bit in LCS unit 220 matches the clock state required by the access. If the current clock state fails to match the clock state required by the access, smart clock cache system 206 returns an invalid access error to the requestor. If the current clock state matches the clock state required by the access, smart clock cache system 206 forwards the access to the intended hardware in the chip for execution. Then smart clock cache system 206 waits for the next access.

If the current clock state indicated by the associated bit in LCS unit 220 matches the clock state required by the access, smart clock cache system 206 forwards the access to the chip for execution. Smart clock cache system 206 then determines whether the hardware returns an access clock error indicating that the required clock state of the access does not match the current clock state of the clock domain associated with the hardware. If smart clock cache system 206 fails to receive an access clock error, then smart clock cache system 206 waits for the next access.

If smart clock cache system 206 receives an access clock error, then smart clock cache system 206 verifies the clock state of the associated clock domain by reading the clock state of the associated clock domain from the chip and updating the associated bit in LCS unit 220 to either indicate 0 for off/ stopped and 1 for on/running or 0 for on/running and 1 for off/stopped, depending on implementation. Smart clock cache system 206 then sets the associated validity bit in CT unit 222 to trusted.

Smart clock cache system 206 then determines whether the current clock state indicated by the associated bit in LCS unit 220 matches the clock state required by the access. If the current clock state still fails to match the clock state required by the access, smart clock cache system 206 returns an invalid access error to the requestor. If the current clock state matches the clock state required by the access, smart clock cache system 206 again forwards the access to the intended hardware in the chip for execution. Then smart clock cache system 206 waits for the next access.

Again, if at any time during operation the chip is unlocked for external access, smart clock cache system 206 sets all of the validity bits in CT unit 222 associated with the chip to un-trusted. Additionally, if smart clock cache system 206 receives an access that may impact one or more clock domains of a chip, such as a scanflush, reset, self-test, or the like, and the access is performed by the hardware of the chip, then smart clock cache system 206 sets the associated validity domain bits in CT unit 222 to un-trusted.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 3:
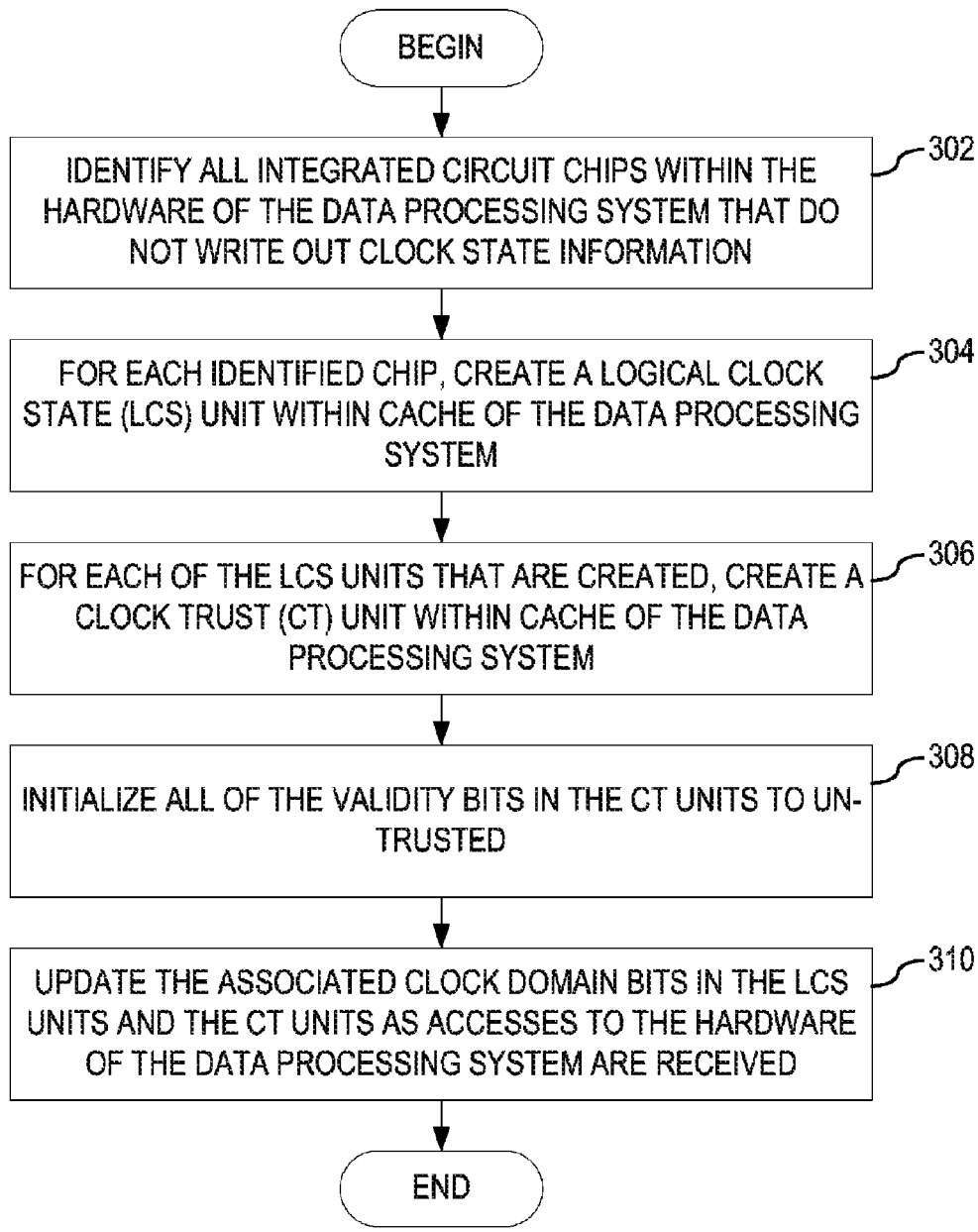
FIG. 3 depicts a flow diagram of initializing a data processing system with a smart clock cache system in accordance with an illustrative embodiment.
Figure 4:
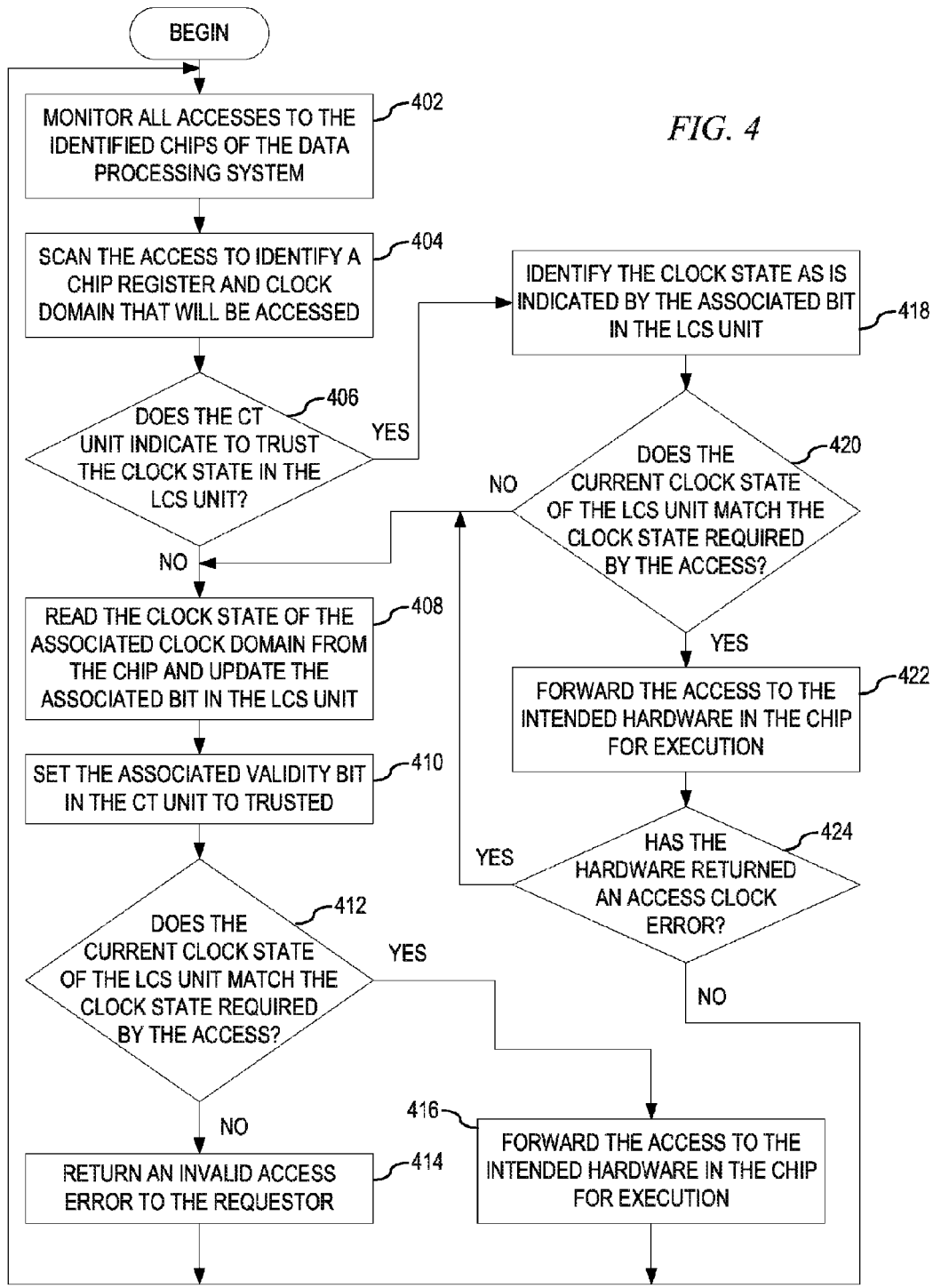
FIG. 4 depicts a flow diagram of the process performed by the smart clock cache system in updating the associated clock domain bits in Logical Clock State (LCS) units and Clock Trust (CT) units as accesses to the hardware of the data processing system are received in accordance with an illustrative embodiment.

Referring now to FIGS. 3-4, these figures provide flowcharts outlining example operations of a mechanism for monitoring a clock state of a chip without having to perform the extra hardware accesses to read the chip's clock state registers. FIG. 3 depicts a flow diagram of initializing a data processing system with a smart clock cache system in accordance with an illustrative embodiment. As the operation begins, the smart clock cache system identifies all integrated circuit chips within the hardware of the data processing system that do not write out clock state information (step 302). For each identified chip, the smart clock cache system creates a Logical Clock State (LCS) unit within cache of the data processing system (step 304). The LCS unit comprises a bit for each clock domain within the chip and each bit within the LCS unit holds an indication of the clock state information of its respective clock domain of the chip. For each of the LCS units that are created, the smart clock cache system creates a Clock Trust (CT) unit within cache of the data processing system (step 306). Each CT unit comprises a bit for each bit within its associated LCS unit and each bit within the CT unit holds an indication of the validity of the clock state information in the associated bit of the LCS unit. At the beginning of an initial program load (IPL), the smart clock cache system initializes all of the validity bits in the CT units to un-trusted (step 308). The validity bits may either be set to 0 for un-trust and 1 for trust or 0 for trust and 1 for un-trust, depending on implementation. After the initial program load, the smart clock cache system then updates the associated clock domain bits in the LCS units and the CT units as accesses to the hardware of the data processing system are received (step 310) as will be described in FIG. 4, with the operation ending thereafter.

FIG. 4 depicts a flow diagram of the process performed by the smart clock cache system in updating the associated clock domain bits in Logical Clock State (LCS) units and Clock Trust (CT) units as accesses to the hardware of the data processing system are received in accordance with an illustrative embodiment. As the operation begins, the smart clock cache system monitors all accesses to the identified chips of the data processing system (step 402). When the smart clock cache system identifies an access to one or more of the identified chips, the smart clock cache system scans the access to identify a chip register and a clock domain that will be accessed (step 404). The smart clock cache system then determines whether the associated bit of the CT unit associated with the chip register and the clock domain indicates whether or not to trust the clock state indicated by the associated bit in the associated LCS unit (step 406).

If at step 406 the associated bit in the CT unit indicates that the clock state indicated by the associated bit in the LCS unit is un-trusted, the smart clock cache system reads the clock state of the associated clock domain from the chip and updates the associated bit in the LCS unit to either indicate 0 for off/stopped and 1 for on/running or 0 for on/running and 1 for off/stopped, depending on implementation (step 408). The smart clock cache system then sets the associated validity bit in the CT unit to trusted (step 410). The smart clock cache system then determines whether the current clock state indicated by the associated bit in the LCS unit matches the clock state required by the access (step 412). If at step 412 the current clock state fails to match the clock state required by the access, the smart clock cache system returns an invalid access error to the requestor (step 414), with the operation returning to step 402 to wait for the next access. If at step 412 the current clock state matches the clock state required by the access, then the smart clock cache system forwards the access to the intended hardware in the chip for execution (step 416), with the operation returning to step 402 to wait for the next access.

If at step 406 the associated bit in CT unit indicates that the clock state indicated by the associated bit in the LCS unit is trusted, the smart clock cache system identifies the clock state as is indicated by the associated bit in the LCS unit (step 418). The smart clock cache system then determines whether the current clock state indicated by the associated bit in the LCS unit matches the clock state required by the access (step 420). If at step 420 the current clock state indicated by the associated bit in the LCS unit fails to match the clock state required by the access, the smart clock cache system verifies the clock state of the associated clock domain by proceeding to step 408.

If at step 420 the current clock state indicated by the associated bit in the LCS unit matches the clock state required by the access, the smart clock cache system forwards the access to the chip for execution (step 422). The smart clock cache system then determines whether the hardware returns an access clock error indicating that the required clock state of the access does not match the current clock state of the clock domain associated with the hardware (step 424). If at step 424 the smart clock cache system fails to receive an access clock error, then the operation returns to step 402 to wait for the next access. If at step 424 the smart clock cache system receives an access clock error, the smart clock cache system verifies the clock state of the associated clock domain by proceeding to step 408.

At any time during this operation the chip, the smart clock cache system determines that the chip becomes unlocked for external access or the smart clock cache system receives an access that may impact one or more clock domains of a chip, such as a scanflush, reset, self-test, or the like, and the access is performed by the hardware of the chip, then the smart clock cache system sets the associated validity domain bits in the CT unit to un-trusted.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for accurately monitoring a clock state of an integrated circuit chip, which may be referred to simply as a chip, for clock verification without having to perform extra hardware accesses to read the chip's clock state registers. The illustrative embodiments use an intelligent caching system to remember the clock state of the chip and make a best estimation at which operations (clock running or clock stopping) may be performed. The smart clock cache system includes two cached units. The first unit is a Logical Clock State unit whose bits represent the states of the chip's clock domains (either 0=off and 1=on or 0=on and 1=off, depending on implementation). The second unit is Clock Trust unit that indicates a validity of bits in the Logical Clock State unit (either 0=un-trust and 1=trust or 0=trust and 1=un-trust, depending on implementation). These two units' values work in conjunction with each other and are updated when there is an activity that may result in a chip clock state change (hardware access) or chip clock state becomes unknown (losing control of the chip). To do clock checking, the illustrative embodiments monitor these two units instead of accessing the hardware every time. If the Clock Trust unit indicates the associated clock domains are 'trusted', the illustrative embodiments use the current clock state stored in the Logical Clock State unit. Otherwise, a hardware access is required, but then the Logical Clock State and Clock Trust units are updated to be valid for subsequent clock checking on the chip. In addition, as a safeguard to avoid unexpected errors, the Smart Clock cache system will verify from the hardware if an operation seems to be requested at the wrong clock state (from cache) or if the operation results in a clock state error.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for monitoring and verifying a clock state of a chip that does not write out clock state information, the method comprising:
   responsive to identifying an access to the chip, scanning, by the processor, the access to identify a chip register and a clock domain that will be accessed;
   determining, by the processor, whether a bit of a clock trust unit associated with the chip register and the clock domain indicates whether to trust a clock state associated with the bit in a logical clock state unit;
   responsive to the bit of the clock trust unit indicating that the clock state associated with the bit in the logical clock state unit is trusted, identifying, by the processor, the clock state from the logical clock state unit;
   determining, by the processor, whether the clock state matches a clock state required by the access; and
   responsive to the clock state matching the clock state required by the access, forwarding, by the processor, the access to the chip for execution.

2. The method of claim 1, further comprising:
   responsive to the bit of the clock trust unit indicating that the clock state associated with the bit in the logical clock state unit is un-trusted, reading, by the processor, a current clock state of the clock domain associated with the access from the chip;
   updating, by the processor, the clock state in the logical clock state unit with the current clock state;
   setting, by the processor, the bit in the clock trust unit to trusted;
   determining, by the processor, whether the clock state matches a clock state required by the access; and
   responsive to the clock state matching the clock state required by the access, forwarding, by the processor, the access to the chip for execution.

3. The method of claim 2, further comprising:
   responsive to the clock state failing to match the clock state required by the access, returning, by the processor, an invalid access error to a requestor of the access.

4. The method of claim 1, further comprising:
   responsive to the clock state failing to match the clock state required by the access, reading, by the processor, a current clock state of the clock domain associated with the access from the chip;
   updating, by the processor, the clock state in the logical clock state unit with the current clock state;
   setting, by the processor, the bit in the clock trust unit to trusted;
   determining, by the processor, whether the clock state matches a clock state required by the access; and
   responsive to the clock state matching the clock state required by the access, forwarding, by the processor, the access to the chip for execution.

5. The method of claim 4, further comprising:
   responsive to the clock state failing to match the clock state required by the access, returning, by the processor, an invalid access error to a requestor of the access.

6. The method of claim 1, further comprising:
   determining, by the processor, whether the chip returns an access clock error indicating that the required clock state of the access does not match the clock state of the clock domain;
   responsive to receiving the access clock error, reading, by the processor, a current clock state of the clock domain associated with the access from the chip;

updating, by the processor, the clock state in the logical clock state unit with the current clock state;

setting, by the processor, the bit in the clock trust unit to trusted;

determining, by the processor, whether the clock state matches a clock state required by the access; and responsive to the clock state matching the clock state required by the access, forwarding, by the processor, the access to the chip for execution.

7. The method of claim 6, further comprising:

responsive to the clock state failing to match the clock state required by the access, returning, by the processor, an invalid access error to a requestor of the access.

8. The method of claim 1, wherein, upon initialization of the data processing system, the processor:

identifies all chips within hardware of the data processing system that do not write out clock state information;

for each identified chip, creates a logical clock state unit within cache of the data processing system, wherein the logical clock state unit comprises a bit for each clock domain within the chip and wherein each bit within the logical clock state unit holds an indication of the clock state of its respective clock domain of the chip;

for each logical clock state unit, creates a clock trust unit within the cache of the data processing system, wherein each clock trust unit comprises a bit for each bit within its associated logical clock state unit and wherein each bit within the clock trust unit holds an indication of the validity of the clock state in the associated bit of the logical clock state unit; and initializes all of the bits in the clock trust units to un-trusted.

9. A computer program product comprising a computer readable storage medium having a computer readable program stored therein, wherein the computer readable program, when executed on a computing device, causes the computing device to:

responsive to identifying an access to the chip, scan the access to identify a chip register and a clock domain that will be accessed;

determine whether a bit of a clock trust unit associated with the chip register and the clock domain indicates whether to trust a clock state associated with the bit in a logical clock state unit;

responsive to the bit of the clock trust unit indicating that the clock state associated with the bit in the logical clock state unit is trusted, identify the clock state from the logical clock state unit;

determine whether the clock state matches a clock state required by the access; and responsive to the clock state matching the clock state required by the access, forward the access to the chip for execution.

10. The computer program product of claim 9, wherein the computer readable program further causes the computing device to:

responsive to the bit of the clock trust unit indicating that the clock state associated with the bit in the logical clock state unit is un-trusted, read a current clock state of the clock domain associated with the access from the chip;

update the clock state in the logical clock state unit with the current clock state;

set the bit in the clock trust unit to trusted;

determine whether the clock state matches a clock state required by the access; and responsive to the clock state matching the clock state required by the access, forward the access to the chip for execution.

11. The computer program product of claim 10, wherein the computer readable program further causes the computing device to:

responsive to the clock state failing to match the clock state required by the access, return an invalid access error to a requestor of the access.

12. The computer program product of claim 9, wherein the computer readable program further causes the computing device to:

responsive to the clock state failing to match the clock state required by the access, read a current clock state of the clock domain associated with the access from the chip;

update the clock state in the logical clock state unit with the current clock state;

set the bit in the clock trust unit to trusted;

determine whether the clock state matches a clock state required by the access;

responsive to the clock state matching the clock state required by the access, forward the access to the chip for execution; and responsive to the clock state failing to match the clock state required by the access, return an invalid access error to a requestor of the access.

13. The computer program product of claim 9, wherein the computer readable program further causes the computing device to:

determine whether the chip returns an access clock error indicating that the required clock state of the access does not match the clock state of the clock domain;

responsive to receiving the access clock error, read a current clock state of the clock domain associated with the access from the chip;

update the clock state in the logical clock state unit with the current clock state;

set the bit in the clock trust unit to trusted;

determine whether the clock state matches a clock state required by the access;

responsive to the clock state matching the clock state required by the access, forward the access to the chip for execution; and responsive to the clock state failing to match the clock state required by the access, return an invalid access error to a requestor of the access.

14. The computer program product of claim 9, wherein, upon initialization of the data processing system, the computer readable program further causes the computing device to:

identify all chips within hardware of the data processing system that do not write out clock state information;

for each identified chip, create a logical clock state unit within cache of the data processing system, wherein the logical clock state unit comprises a bit for each clock domain within the chip and wherein each bit within the logical clock state unit holds an indication of the clock state of its respective clock domain of the chip;

for each logical clock state unit, create a clock trust unit within the cache of the data processing system, wherein each clock trust unit comprises a bit for each bit within its associated logical clock state unit and wherein each bit within the clock trust unit holds an indication of the validity of the clock state in the associated bit of the logical clock state unit; and initialize all of the bits in the clock trust units to un-trusted.

15. An apparatus, comprising:
a processor; and
a memory coupled to the processor, wherein the memory comprises instructions which, when executed by the processor, cause the processor to:
responsive to identifying an access to the chip, scan the access to identify a chip register and a clock domain that will be accessed;
determine whether a bit of a clock trust unit associated with the chip register and the clock domain indicates whether to trust a clock state associated with the bit in a logical clock state unit;
responsive to the bit of the clock trust unit indicating that the clock state associated with the bit in the logical clock state unit is trusted, identify the clock state from the logical clock state unit;
determine whether the clock state matches a clock state required by the access; and
responsive to the clock state matching the clock state required by the access, forward the access to the chip for execution.

16. The apparatus of claim 15, wherein the instructions further cause the processor to:
responsive to the bit of the clock trust unit indicating that the clock state associated with the bit in the logical clock state unit is un-trusted, read a current clock state of the clock domain associated with the access from the chip;
update the clock state in the logical clock state unit with the current clock state;
set the bit in the clock trust unit to trusted;
determine whether the clock state matches a clock state required by the access; and
responsive to the clock state matching the clock state required by the access, forward the access to the chip for execution.

17. The apparatus of claim 16, wherein the instructions further cause the processor to:
responsive to the clock state failing to match the clock state required by the access, return an invalid access error to a requestor of the access.

18. The apparatus of claim 15, wherein the instructions further cause the processor to:
responsive to the clock state failing to match the clock state required by the access, read a current clock state of the clock domain associated with the access from the chip;
update the clock state in the logical clock state unit with the current clock state;
set the bit in the clock trust unit to trusted;
determine whether the clock state matches a clock state required by the access;
responsive to the clock state matching the clock state required by the access, forward the access to the chip for execution; and
responsive to the clock state failing to match the clock state required by the access, return an invalid access error to a requestor of the access.

19. The apparatus of claim 15, wherein the instructions further cause the processor to:
determine whether the chip returns an access clock error indicating that the required clock state of the access does not match the clock state of the clock domain;
responsive to receiving the access clock error, read a current clock state of the clock domain associated with the access from the chip;
update the clock state in the logical clock state unit with the current clock state;
set the bit in the clock trust unit to trusted;
determine whether the clock state matches a clock state required by the access;
responsive to the clock state matching the clock state required by the access, forward the access to the chip for execution; and
responsive to the clock state failing to match the clock state required by the access, return an invalid access error to a requestor of the access.

20. The apparatus of claim 15, wherein, upon initialization of the data processing system, the instructions further cause the processor to:
identify all chips within hardware of the data processing system that do not write out clock state information;
for each identified chip, create a logical clock state unit within cache of the data processing system, wherein the logical clock state unit comprises a bit for each clock domain within the chip and wherein each bit within the logical clock state unit holds an indication of the clock state of its respective clock domain of the chip;
for each logical clock state unit, create a clock trust unit within the cache of the data processing system, wherein each clock trust unit comprises a bit for each bit within its associated logical clock state unit and wherein each bit within the clock trust unit holds an indication of the validity of the clock state in the associated bit of the logical clock state unit; and
initialize all of the bits in the clock trust units to un-trusted.

* * * * *